Aug. 11, 1959
N. B. HAST
2,898,761
ASCERTAINING STRESSES AND DEFORMATIONS
IN SOLID LOADED MATERIALS
Filed Jan. 20, 1954
2 Sheets-Sheet 1
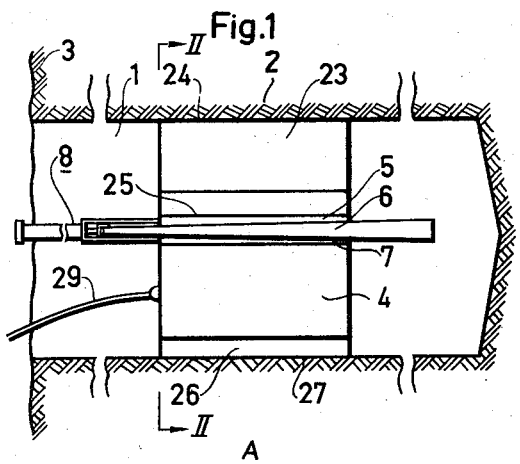
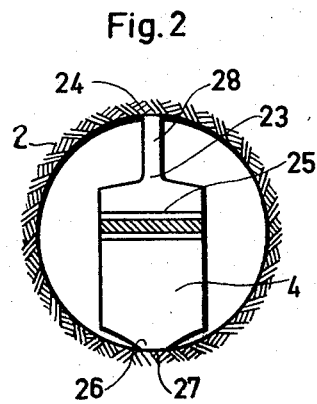
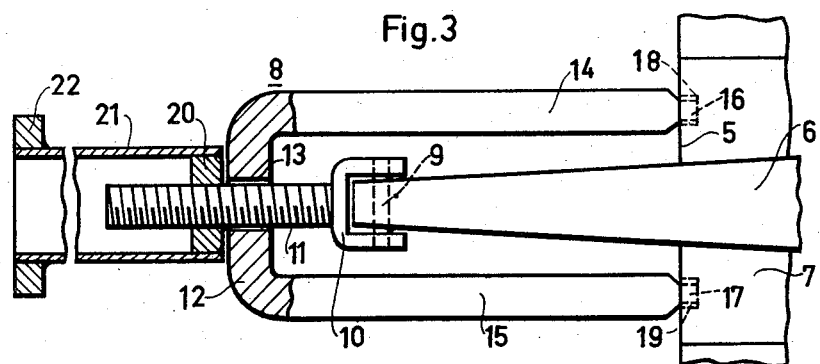
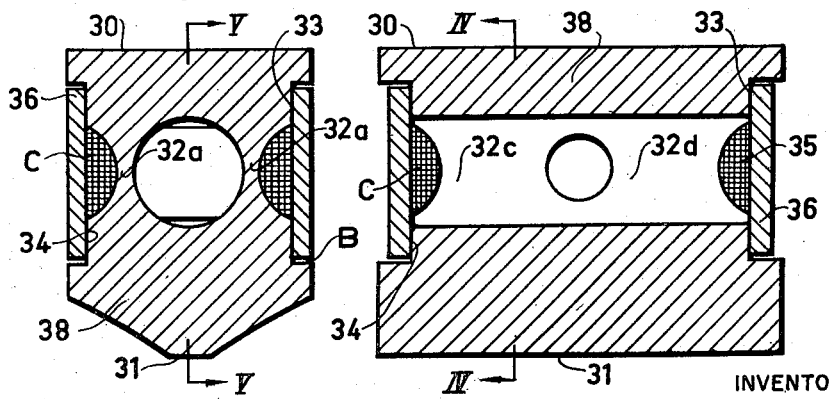
INVENTOR
NILS BERNHARD HAST
BY
ATTORNEYS Aug. 11, 1959
N. B. HAST
2,898,761
ASCERTAINING STRESSES AND DEFORMATIONS IN SOLID LOADED MATERIALS
Filed Jan. 20, 1954
2 Sheets-Sheet 2
Fig.6
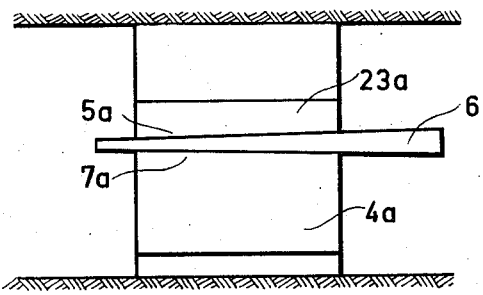
Fig.7
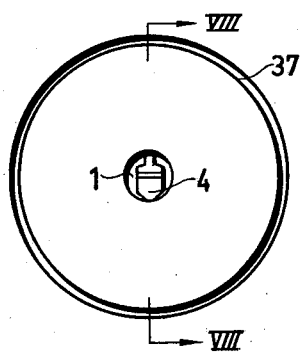
Fig.8
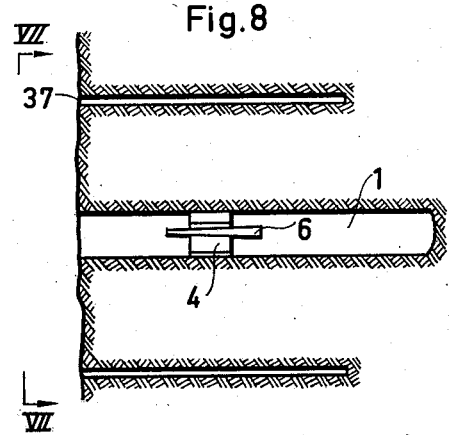
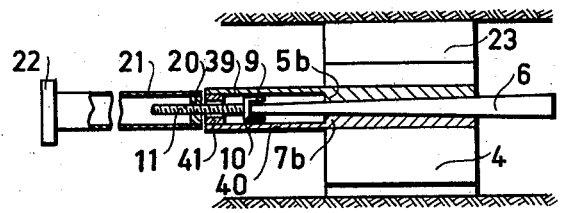
Fig.9
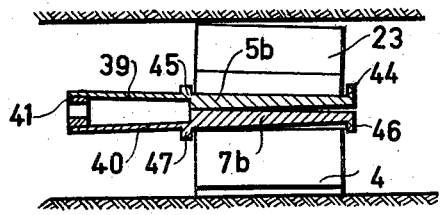
Fig.10
INVENTOR
NILS BERNHARD HAST
BY
ATTORNEYS

United States Patent Office 2,898,761
Patented Aug. 11, 1959

2,898,761

ASCERTAINING STRESSES AND DEFORMATIONS IN SOLID LOADED MATERIALS

Nils Bernhard Hast, Stockholm, Sweden

Application January 20, 1954, Serial No. 405,111

9 Claims. (Cl. 73—88)

The present invention relates to a method of ascertaining fluctuations in stresses and deformations in solid materials, particularly in the rock adjacent mines and other underground excavations. For instance, in mine working such methods have been urgently wanted for a long time to enable the miners to measure the stresses in remaining rock column or in the walls and roofs of the galleries of mines.

As a further example, it has been desirable to know the distribution of stresses in solid dam structures, particularly the way in which such stresses fluctuate in the course of time and in the operation thereof.

One object of the invention is to provide a reliable method to ascertain such stresses or deformations and fluctuations thereof, if any, that may be caused by proceeding excavations et cetera, in a simple manner and a more particular object is to enable a measuring of the absolute value of such stresses and deformations in the material.

A further object is to produce a simple and reliable device to be used when realizing said method.

With these and other objects in view said method comprises the steps of providing a hole in the material past that point where the stress or deformation is to be ascertained, inserting at least one solid force or deformation measuring cell into said hole at a distance from the bottom and from the mouth of the hole, bringing said cell to contact diametrically opposite portions of the wall of the hole, subjecting said cell to a biasing force (precompression), making a first observation of said biasing force and making a subsequent observation thereof to ascertain any fluctuation in the stresses or deformations in said solid material occurred in the time interval between said two observations.

With the particular object to measure the absolute value of the stresses and deformations the present invention provides the steps of biasing said cell, making a first observation of the biasing force, driving a continuous annular slot into the material substantially coaxially of said hole to a depth sufficient to remove the stresses in the material between the hole and the slot and making a subsequent observation of the change in biasing force to measure the absolute value of the stresses and deformations in the material at the moment of the first observation.

The invention will now be more closely described with reference to the accompanying drawings on which:

Fig. 1 is a longitudinal section through a rock in which the stresses or deformations are to be ascertained, Fig. 2 a section on line II—II in Fig. 1, Fig. 3 a partial section of a detail in Fig. 1 on an enlarged scale, Fig. 4 a cross section of a measuring cell on line IV—IV in Fig. 5, Fig. 5 a longitudinal section thereof on line V—V in Fig. 4, Fig. 6 a diagrammatic view of a modification of the device shown in Fig. 1, Fig. 7 an illustration of a modified method in a view taken on line VII—VII in Fig. 8, Fig. 8 a section on line VIII—VIII in Fig. 7, Fig. 9 a modification of the device shown in Fig. 3 and Fig. 10 a further modification thereof.

In carrying out the method illustrated in Figs. 1 and 2 a hole 1 is driven into the rock 2 from the wall 3 of a cavity therein, for instance, a mine shaft or the like. The diameter of the hole may be some 26 millimeters and its depths may be some 0.5 meter or less as well as up to several meters.

Into said hole there is inserted a solid force or deformation measuring cell 4 which may be of any type which is usable to indicate or measure the force exerted thereon or the deformation to which it is subjected. A very suitable cell of this type may be a so called magnetostrictive unit. An embodiment thereof will be described below.

There are further three wedges 5, 6, 7 having a comparatively small wedge angle. The intermediate wedge surfaces are preferably lubricated by oil or paraffin depending on the prevailing pressure. Such lubricating means has for its object to cause a uniform distribution of the pressure and to minimize any longitudinal frictional forces. The wedge angle should be so selected that the wedge unit is self-locking and cannot be dislocated by the exertion of transversal forces. The middle wedge 6 is displaceable in relation to the other wedges 5 and 7 and there is a wedge driving means, generally designated 8, and supported on the outer wedges 5 and 7 and coupled to the middle wedge 6.

An embodiment of the wedge driving means is shown more closely in Fig. 3. At the end of wedge 6 there is inserted a pin 9 onto which a fork shaped member 10 is pivoted. This has an extension in the shape of a screw threaded pin 11. There is further a yoke 12 having a wide hole 13 providing a clearance in relation to the pin 11 and having two legs 14, 15 with flange like projections 16, 17 supported in slots 18, 19 in the wedges 5 and 7, respectively. A nut 20 engages the pin 11 and rests on the outside of the yoke 12. The nut 20 is provided with a tube 21 secured thereto and carrying a hand wheel or the like 22, preferably being outside the hole 1 to facilitate its rotation by hand. The driving means 8 will operate as follows. When the hand wheel 22 is rotated clockwise the nut 20 will be screwed on the pin 11 so as to force the member 10 and the wedge 6 to approach the yoke 12. The resistance to the displacement of the wedge 6 will be taken up by the legs 14 and 15 and reaction forces will be caused between the projections 16, 17 and the bottom of the slots 18, 19. In this way the wedges 5 and 7 are prevented from moving longitudinally when the wedge 6 is displaced to the left.

There is further an abutment member 23 in the shape of a profiled bar, interposed between an upper abutment surface 24 of the wall of the hole 1 and the upper surface 25 of the wedge 5. Also the measuring cell 4 is below provided with a flange like projection 26 bearing against a corresponding abutment surface 27 of the wall of the hole 1. The arrangement is preferably such that the surfaces 24 and 27 will be substantially diametrically opposite and the flange like projection 28 of the member 23 and the similar projection of the cell 4 bear against said abutment surfaces only along narrow contact surfaces.

In carrying out the method as illustrated in Fig. 1 the hole 1 is provided in the material past that point where the stress or deformation is to be ascertained, as at A, whereupon at least one force or deformation indicating unit 4, 7, 6, 5, 23 is inserted into the hole it being observed that this unit will be spaced both from the mouth of the hole 1 and from the bottom thereof. By operating the driving means 8 the member 23 and the cell 4 are brought to bear against the abutment surfaces 24 and 27. Thereupon the driving means 8 is further operated and from now on the cell 4 will be subjected to a biasing force or a precompression which may be electrically controlled through electrical conductors indicated by the cable 29 in a manner described below. Making a first observation the biasing force is noted. If then a subsequent observation is made of the biasing force some time afterwards it will be immediately ascertained whether there is any change or not in the biasing force. If there is no such change the conditions in the rock surrounding the measuring unit have remained constant. On the other hand, if there is a change this will immediately indicate that there has been a change in the stresses or deformations in the rock.

With reference to Figs. 4 and 5 a magnetostrictive unit will now be described. It consists of a magnetizable body 38 affording two opposite abutment surfaces 30 and 31 and four uprights, of which three, i.e. 32a, 32c and 32d, are shown on the drawing. They have all a considerably restricted cross sectional area in relation to the remaining parts of the body 38. There is an offset 33 and 34 provided in the body and a magnetic shunt in the form of a soft permalloy plate 36 is tightly surrounding the central portion of the body while leaving small clearances at its longitudinal ends as indicated at B. In the circumferential spaces C there is provided a winding of isolated electrical conductors 35 connected with conductors in the cable 29. If this unit is subjected to compression forces and alternating current is supplied through cable 29 the impedance felt by the alternating current will be a function of the compression exerted on the surfaces 30 and 31 in well known manner and measured by a suitable instrument.

In Fig. 6 is shown an embodiment in which the wedge indicated 5a is made integral with the member indicated 23a. In the same way the wedge 7a is made integral with the measuring cell 4a. The central wedge 6 remains unchanged.

Figs. 7 and 8 illustrate the following modification in the method. After the cell 4 has been biased there is made a first observation of the biasing force. Then a continuous annular slot 37 is driven into the rock substantially coaxially of said hole 1 to a depth sufficient to remove the stresses in the material between the slot and the hole. Then a subsequent observation is made and the change in biasing force measured. This indication will then be a rather exact measure of the absolute value of the stresses and deformations in the material prevailing at the moment of the first observation.

It should be noted that the cell 4 is calibrated before putting it into the hole. For this purpose a hole is made in a prism of a material having the same modulus of elasticity as the rock or other material to be measured. This prism has a hole transversal to its longitudinal direction and of the same diameter as the measuring hole in the rock or the like. The prism is loaded to a known value and the cell is placed in the hole and biased. Thereafter the external load is reduced stepwise and at every step the electrical indication is read-off. In this way I obtain a calibration curve which is used to interpret the electrical indications when measuring the conditions in rocks et cetera.

In the methods illustrated in Figs. 1, 6 and 8 the indication or measurement is performed in a principal direction coinciding with the plane of the drawing. To ascertain stresses in other directions other measuring planes may obviously be used. Several measuring units may be placed in the same hole and they may be arranged in mutually different measuring directions. In this way the directions of principal stresses and the absolute values thereof may be calculated.

The driving means 8 as shown in Fig. 3 may be modified according to Fig. 9 in which the wedges 5b and 7b are integral with tongues 39 and 40. These are rigidly interconnected by means of a piece 41 provided with a through-going hole leaving a free passage for pin 11 as in Fig. 3. Otherwise parts 9, 10, 20, 21 and 22 remain unchanged.

According to Fig. 10 the wedges 5b and 7b are provided with flanges 44, 45 and 46, 47 respectively. They are spaced apart so that they can accommodate parts 23 and 4 respectively in order to hold said parts in fixed positions when they are being inserted into the hole. By biasing the tongues 39 and 40 so as to urge the wedges 5b and 7b to move against one another, in operation the wedges 5b and 7b will normally contact the wedge 6. When the latter is retracted the total height of parts 4, 7b, 6, 5b and 23 will be reduced and the insertion thereof into the hole facilitated. In Fig. 10 is shown the extreme case that the wedge 6 is entirely removed out of contact with parts 5b, 7b.

I claim:

1. A device for producing a selected fixed static force between fixed abutment surfaces comprising a force measuring cell adapted to bear against one of said abutment surfaces, means including a pair of relatively movable members adapted to be positioned between and bear against the other of said abutment surfaces and said cell, said relatively movable members having wedge-shaped engaging surfaces, and driving means supported by one of said movable members for displacing the other of said movable members to move said cell and said means relatively to each other and perpendicularly to said abutment surfaces.

2. A device for producing a selected fixed static force between fixed substantially parallel abutment surfaces comprising a force measuring cell adapted to bear against one of said abutment surfaces, means including a pair of relatively movable elongated members extending generally parallel to said abutment surfaces and adapted to be positioned between and bear against the other of said abutment surfaces and said cell, said relatively movable members having wedge-shaped engaging surfaces, and driving means supported by one of said movable members for displacing the other of said movable members in a direction generally parallel to said abutment surfaces to move said cell and said means relatively to each other and exclusively perpendicularly to said abutment surfaces.

3. A device for producing a selected fixed static force between fixed abutment surfaces comprising a force measuring cell adapted to bear against one of said abutment surfaces, means forming an abutment adapted to bear against the other of said abutment surfaces, three superposed cooperating rigid wedges adapted to be positioned between said cell and said abutment means with one outer one of said wedges bearing against said cell, the other outer one of said wedges bearing against said abutment means and the center wedge being movable with respect to the other two wedges, and wedge driving means coupled to the center wedge and supported on the outer wedges so that in operation it causes the outer wedges to move exclusively perpendicularly to said abutment surfaces while compressing said cell and it prevents the outer wedges from moving along said cell and said abutment means and producing longitudinal frictional forces on the measuring cell.

4. A device for producing a selected fixed static force between fixed abutment surfaces comprising a force measuring cell provided with an extended narrow contact surface adapted to bear against one of said abutment surfaces, means forming an abutment provided with an extended narrow contact surface adapted to bear against the other of said abutment surfaces, three superposed cooperating rigid wedges adapted to be positioned between said cell and said abutment means with one outer one of said wedges bearing against said cell, the other outer one of said wedges bearing against said abutment means and the center wedge being movable with respect to the other two wedges, and wedge driving means coupled to the center wedge and supported on the outer wedges so that in operation it causes the outer wedges to move exclusively perpendicularly to said abutment surfaces while compressing said cell and it prevents the outer wedges from moving along said cell and said abutment means and producing longitudinal frictional forces on the measuring cell.

5. A device for producing a selected fixed static force between fixed substantially parallel abutment surfaces comprising a force measuring cell adapted to bear against one of said abutment surfaces, means including a pair of relatively movable elongated members extending generally parallel to said abutment surfaces and adapted to be positioned between and bear against the other of said abutment surfaces and said cell, said relatively movable members having wedge-shaped engaging surfaces, driving means supported by one of said movable members for displacing the other of said movable members in a direction generally parallel to said abutment surfaces to move said cell and said means relatively to each other and exclusively perpendicularly to said abutment surfaces, and lubricating means inserted between adjacent surfaces of said relatively movable members to cause uniform distribution of pressure therebetween and to minimize longitudinal frictional forces therebetween.

6. A method of ascertaining fluctuations in stresses and deformations in solid loaded materials, comprising the steps of boring a hole in the material extending from an exposed face thereof past that location therein where the stress or deformation is to be ascertained, inserting at least one solid force measuring cell into said hole at a distance from the bottom and from the mouth of the hole, bringing said cell into contact with only diametrically opposite portions of the wall of the hole at the location and on the axis therein where the stress or deformation is to be ascertained, subjecting said cell to a biasing force directed on an axis connecting the contacted diametrically opposite portions of the wall of the hole to exert a force against the wall on said axis, making a first observation of said biasing force by noting the reading of the force measuring cell and making a subsequent observation thereof to ascertain any fluctuation in the stresses or deformations in said solid material occurred in the time interval between said two observations.

7. A method of ascertaining fluctuations in stresses and deformations in solid loaded materials, comprising the steps of boring a hole in the material extending from an exposed face thereof past that location where the stress or deformation is to be ascertained, inserting at least one solid force measuring cell into said hole at a distance from the bottom and from the mouth of the hole, bringing said cell into contact with only diametrically opposite portions of the wall of the hole at the location and on the axis therein where the stress or deformation is to be ascertained, wedging said cell into said hole and immovably locking it in position to establish a biasing force directed along an axis connecting the contacted diametrically opposite portions of the wall of the hole to exert a force against the wall along said axis, making a first observation of said biasing force by noting the reading of the force measuring cell and making a subsequent observation thereof to ascertain any fluctuation in the stresses or deformations in said solid material occurred in the time interval between said two observations.

8. A method of ascertaining fluctuations in stresses and deformations in solid loaded materials, comprising the steps of drilling a hole in the material extending a distance being several times the diameter of the hole from an exposed face of the material past the location therein where the stress or deformation is to be ascertained, inserting at least one solid force measuring cell into said hole at a distance from the bottom and from the mouth of the hole, bringing said cell into contact with only diametrically opposite portions of the wall of the hole at the location and on the axis therein where the stress or deformation is to be ascertained, subjecting said cell to a biasing force directed along an axis connecting the contacted diametrically opposite portions of the wall of the hole to exert a force against the wall along said axis, making a first observation of said biasing force by noting the reading of the force measuring cell and making a subsequent observation thereof to ascertain any fluctuation in the stresses or deformations in said solid material.

9. A method of ascertaining fluctuations in stresses and deformations in solid loaded materials, comprising the steps of providing a hole in the material extending from an exposed face thereof past that location therein where the stress or deformation is to be ascertained, inserting at least one solid force measuring cell into said hole at a distance from the bottom and from the mouth of the hole, bringing said cell into contact with only diametrically opposite portions of the wall of the hole at the location and on the axis therein where the stress or deformation is to be ascertained, subjecting said cell to a biasing force directed along an axis connecting the contacted diametrically opposite portions of the wall of the hole to exert a force against the wall along said axis, making a first observation of said biasing force by noting the reading of the force measuring cell, thereafter providing a continuous annular slot into the material extending from said exposed face thereof substantially coaxially of said hole to a depth sufficient to remove the stresses in the material between the hole and the slot, and then making a second observation of the biasing force by noting the reading of the force measuring cell, whereby the absolute value of the stresses and deformations in the material at the moment of first observation may be determined from the two readings noted.

References Cited in the file of this patent

UNITED STATES PATENTS

| | | |
|---|---|---|
| 1,670,981 | Perkins et al. | May 22, 1928 |
| 2,021,349 | Berg | Nov. 19, 1935 |
| 2,028,514 | Mathar | Jan. 21, 1936 |
| 2,053,560 | Janovsky | Sept. 8, 1936 |
| 2,289,631 | Cuda et al. | July 14, 1942 |
| 2,442,113 | Beijl | May 25, 1948 |
| 2,474,320 | Pelan | June 28, 1949 |
| 2,696,109 | Bennett | Dec. 7, 1954 |

FOREIGN PATENTS

| | | |
|---|---|---|
| 256,006 | Switzerland | Mar. 1, 1949 |
| 1,056,219 | France | Oct. 21, 1953 |

OTHER REFERENCES

Article entitled "Measuring Bed Rock Action Under Tygart Dam," by J. E. Deignan, in Engineering News Record, vol. 116, May 21, 1936, p. 731.